United States Patent
Smith et al.

(10) Patent No.: US 7,315,563 B2
(45) Date of Patent: Jan. 1, 2008

(54) MULTICARRIER ORTHOGONAL SPREAD-SPECTRUM (MOSS) DATA COMMUNICATIONS

(75) Inventors: Stephen F. Smith, London, TN (US); William B. Dress, Camas, WA (US)

(73) Assignee: UT-Battelle LLC, Oak Ridge, TN (US)

(*) Notice: Subject to any disclaimer, the term of this patent is extended or adjusted under 35 U.S.C. 154(b) by 683 days.

(21) Appl. No.: 10/726,475

(22) Filed: Dec. 3, 2003

(65) Prior Publication Data

US 2005/0123023 A1 Jun. 9, 2005

(51) Int. Cl.
H04B 1/00 (2006.01)
H04B 7/216 (2006.01)
H04J 9/00 (2006.01)
H04J 11/00 (2006.01)

(52) U.S. Cl. ............... 375/130; 370/203; 370/208; 370/335

(58) Field of Classification Search .............. 370/203, 370/208, 209, 328, 329, 335, 330, 343, 342; 375/360, 130; 455/63
See application file for complete search history.

(56) References Cited

U.S. PATENT DOCUMENTS

| | | | |
|---|---|---|---|
| 3,475,558 A | 10/1969 | Cahn | |
| 4,084,137 A | 4/1978 | Welti | |
| 4,435,821 A | 3/1984 | Ito et al. | |
| 4,521,878 A | 6/1985 | Toyonaga | |
| 4,550,292 A | 10/1985 | Smith | |
| 5,274,665 A | 12/1993 | Schilling | |
| 5,410,538 A | 4/1995 | Roche et al. | |
| 5,442,662 A * | 8/1995 | Fukasawa et al. | 370/342 |
| 5,469,469 A | 11/1995 | Haines | |
| 5,521,937 A | 5/1996 | Kondo et al. | |
| 5,539,730 A | 7/1996 | Dent | |
| 5,623,487 A | 4/1997 | Natali | |
| 5,956,345 A | 9/1999 | Allpress et al. | |
| 6,005,886 A | 12/1999 | Short | |
| 6,014,446 A * | 1/2000 | Finkelstein | 380/46 |
| 6,018,528 A | 1/2000 | Gitlin et al. | |
| 6,035,008 A * | 3/2000 | Kim | 375/345 |
| 6,188,715 B1 | 2/2001 | Partyka | |
| 6,223,053 B1 | 4/2001 | Friedmann et al. | |
| 6,229,796 B1 | 5/2001 | Dent | |

(Continued)

FOREIGN PATENT DOCUMENTS

EP 0485108 5/1992

(Continued)

OTHER PUBLICATIONS

Hara et. al. "Overview of Multicarrier CDMA", IEEE 1997.*

(Continued)

Primary Examiner—Mohammed Ghayour
Assistant Examiner—Sophia Vlahos
(74) Attorney, Agent, or Firm—John Bruckner PC

(57) ABSTRACT

Systems and methods are described for multicarrier orthogonal spread-spectrum (MOSS) data communication. A method includes individually spread-spectrum modulating at least two of a set of orthogonal frequency division multiplexed carriers, wherein the resulting individually spread-spectrum modulated at least two of a set of orthogonal frequency division multiplexed carriers are substantially mutually orthogonal with respect to both frequency division multiplexing and spread-spectrum modulation.

33 Claims, 4 Drawing Sheets

U.S. PATENT DOCUMENTS

| | | | |
|---|---|---|---|
| 6,243,397 B1 | 6/2001 | Yun | |
| 6,289,038 B1 | 9/2001 | Park | |
| 6,654,408 B1* | 11/2003 | Kadous et al. | 375/148 |
| 6,680,966 B2* | 1/2004 | Lemois et al. | 375/141 |
| 6,721,339 B2* | 4/2004 | Li et al. | 370/535 |
| 6,834,047 B1* | 12/2004 | Yoon et al. | 370/342 |
| 6,937,558 B2* | 8/2005 | Wakutsu | 370/208 |
| 6,987,747 B1* | 1/2006 | Mottier et al. | 370/335 |
| 7,161,895 B1* | 1/2007 | Sudo | 370/204 |
| 7,161,927 B2* | 1/2007 | Wu et al. | 370/342 |
| 2002/0034191 A1 | 3/2002 | Shattil | |
| 2003/0123383 A1 | 7/2003 | Korobkov et al. | |
| 2003/0165183 A1 | 9/2003 | Ketchum | |
| 2004/0114671 A1* | 6/2004 | Inogai | 375/146 |
| 2004/0252629 A1* | 12/2004 | Hasegawa et al. | 370/208 |

FOREIGN PATENT DOCUMENTS

| | | |
|---|---|---|
| EP | 1128624 | 8/2001 |
| JP | 11-41204 | 2/1999 |
| WO | WO 00/11823 | 3/2000 |
| WO | WO 01/01584 | 1/2001 |
| WO | WO 02/27992 | 4/2002 |
| WO | WO 03/043235 | 5/2003 |
| WO | WO 2005/025074 | 3/2005 |

OTHER PUBLICATIONS

Chang et. al. "Wavelet-Based Multi-Carrier CDMA for Personal Communications systems", IEEE 1996.*

Dinan et. al. "Spreading Codes for Direct Sequence CDMA and Wideband CDMA Cellular Networks", IEEE 1998.*

International Search Report & Written Opinion of the International Searching Authority from PCT/US2004/040732, Jun. 10, 2005.

International Search Report & Written Opinion of the International Searching Authority from PCT/US2004/040754, May 10, 2005.

Ezio Biglieri, "Digital modulation techniques" CRC Press LLC, chapter 20, paragraphs 20.1-20.7, 2002.

Benedetto et al., IEEE Enginers Sociedade Brasiliera de Teleconumicacoes: "Polarization shift keying: an efficient coherent optical modulation" SBT/IEEE, pp. 0014-0020, Sep. 3, 1990.

International Search Report & Written Opinion of the International Searching Authority from PCT/US2004/040680, Nov. 3, 2005.

Hara et al., "Overview of Multicarrier CDMA" IEEE Communications Magazine, IEEE Service Center, Piscataway, N.J., USA pp. 126-133, Dec. 1997.

Jong et al., "Performance Analysis of coded multicarrier spread-spectrum systems in the presence of multipath fading and nonlinearities", IEEE Transactions on Communications, vol. 49, No. 1, pp. 168-179, Jan. 2001.

Magill, "Multi-carrier modulated orthogonal code-division multiple access (MCM-OCDMA)" in K. Fazel and G.P. Fettweis (eds.) Multi-Carrier Spread-Specturm, Kluwer Academic Publishers, pp. 105-110, 1997.

Harada et al., "Performance analysis of a new multi-code and multi-carrier hybrid transmission scheme for future broadband mobile communication systems" In K. Fazel and G.P. Fettweis (eds.) Multi-Carrier Spread-Spectrum, Kluwer Academic Publishers, pp. 41-48, 1997.

International Search Report for PCT/US01/30421, Sep. 10, 2002.

Yang, et al., "Blind Joint Soft-Detection Assisted Slow Frequency-Hopping Multicarrier DS-CDMA" IEEE Transactions on Communications, vol. 48, No. 9, pp. 1520-1529, Sep. 2000.

Enjia, et al. "The Study of FH/MCFD/SSMA/DPSK Wireless Communication Systems" Department of Electronics, Peking University, International Conference on Communication Technology, pp. S18-06-1 through S18-065, Oct. 22, 1998.

Oh, et al. "The Bandwidth Efficiency Increasing Method of Multi-Carrier CDMA and its Performance Evaluation in comparison with DS-CDMA with Rake Receivers" Department of Information & Communication Engineering, Chonbuk National University, Chonju, Korea, pp. 561-565, May 16, 1999.

Nahier, et al., "Das-Multi-Carrier-Spreizspektrumsystem Helex", vol. 72, No. 16, pp. 78-80, Jul. 23, 1999.

Koulakiotis et al., "Comparative study of interference cancellation schemes in multi-user detection", IEE, 1997, pp. 10/1-10/7, 1997.

Ortigoza-Guerrero et al., "A dynamic resource allocation strategy for future UMTS", IEEE, 1998, pp. 377-381, 1998.

Azad et al., "Multirate spread spectrum direct sequence CDMA techniques", I$$ 1994, pp. 4/1-4/5, 1994.

* cited by examiner

MULTICARRIER ORTHOGONAL SPREAD-SPECTRUM (MOSS) DATA COMMUNICATIONS

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of communications. More particularly, the invention relates to methods of multicarrier orthogonal spread-spectrum communications, and machinery for transmitting and/or receiving such communications.

2. Discussion of the Related Art

In digital data-transmission systems, the principal goal is generally to maximize the data-transmission rate, consistent with the legally permissible occupied RF (radio frequency) bandwidth for the signal and the available signal-to-noise ratio (SNR) for the selected channel or RF link path. An additional consideration is the maximum transmitted RF power levels allowed in the various bands. For instance, in the 902-928 MHz ISM (Industrial, Scientific, and Medical) band, up to 1 watt of RF power is currently permitted in the U.S., with a maximum isotropic antenna power gain of 4 (6 dBi); for higher antenna gains, the RF power must be reduced linearly to provide no more than 4 W EIRP (effective isotropic radiated power). In the 2.450-2.4835 GHz band, ¼ watt of power can currently be used, with the same maximum antenna gain of 6 dBi, for a maximum nominal EIRP of 1 W; for higher antenna gains, the RF power must be reduced by 1 dB for every 3 dB of additional antenna gain. In the 5.725-5.825 GHz ISM band (which at present experiences the least RF interference of the three ISM bands and is thus preferred for data-link applications) for FCC-compliant spread-spectrum devices, up to 1 W of RF output power is currently permitted, without regard for antenna gains of greater than 6 dBi, so long as the minimum direct-sequence process gain of 10 dB is maintained. OFDM systems in the U.S. fall under specific Unlicensed National Information Infrastructure (U-NII) as well as ISM regulations. OFDM systems are presently not permitted at all in the 915-MHz ISM band and are limited to a ¼-watt RF output power level in the 5.8-GHz ISM band (and much lower levels in the 5.1- and 5.3-GHz U-NII bands).

SUMMARY OF THE INVENTION

There is a need for the following aspects of the invention. Of course, the invention is not limited to these aspects.

According to an aspect of the invention, a process comprises: individually spread-spectrum modulating at least two of a set of orthogonal frequency division multiplexed carriers, wherein the resulting individually spread-spectrum modulated at least two of a set of orthogonal frequency division multiplexed carriers are substantially mutually orthogonal with respect to both frequency division multiplexing and spread-spectrum modulation. According to another aspect of the invention, a process comprises: individually spread-spectrum demodulating at least two of a set of individually spread-spectrum modulated orthogonal frequency division multiplexed carriers that are substantially mutually orthogonal with respect to both frequency division multiplexing and spread-spectrum modulation. According to another aspect of the invention, a machine comprises: a plurality of orthogonal frequency division multiplex generators; a plurality of data modulators, each of the plurality of data modulators coupled to one of the plurality of orthogonal frequency division multiplex generators; and a linear summer coupled to the plurality of data modulators. According to another aspect of the invention, a machine comprises a plurality of demodulator/despreader circuits; and a plurality of low-pass filters, each of the plurality of low-pass filters coupled to one of the plurality of demodulator/despreader circuits.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

FIG. 1 depicts a spectral plot of a typical Moss signal.

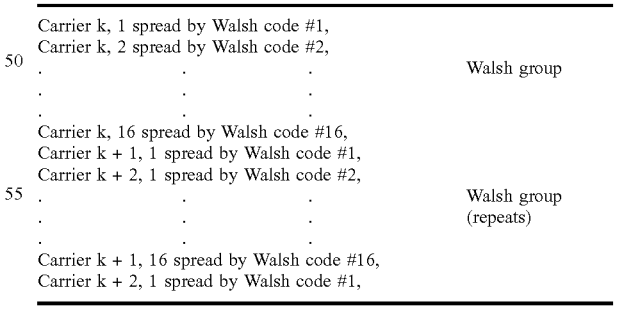

Figure 2:
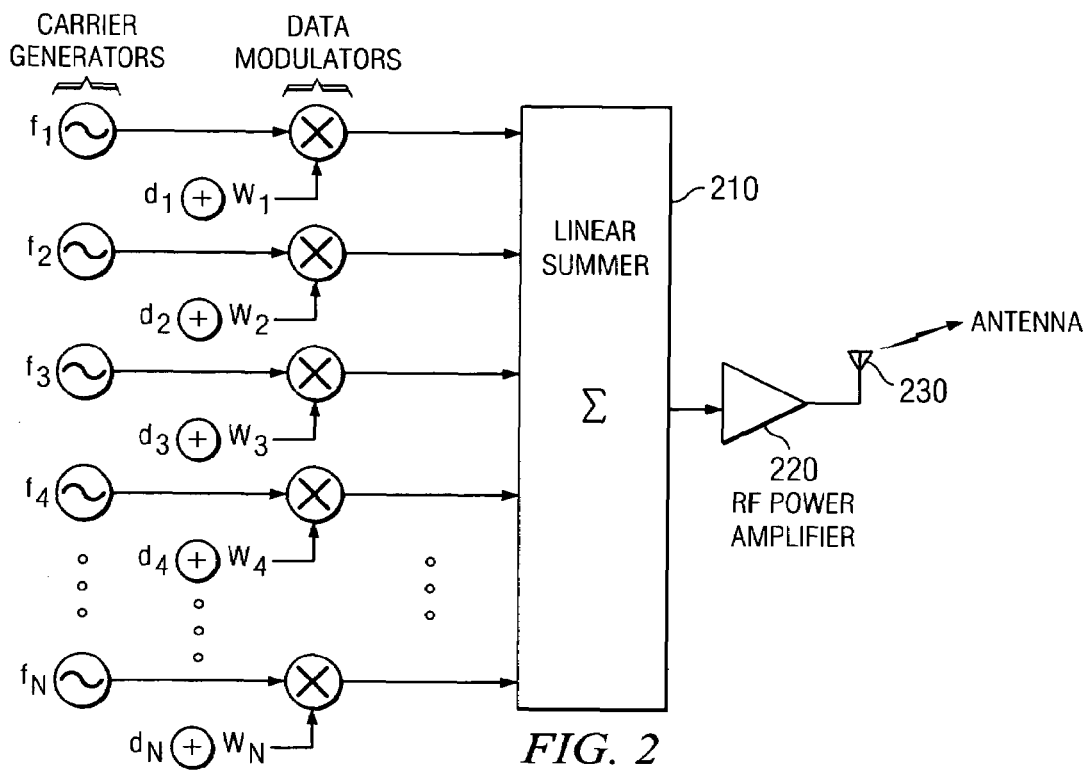

FIG. 2 illustrates a block diagram of a MOSS transmitter, representing and embodiment of the invention. FIG. 2 depicts a typical MOSS transmitter block diagram.

Channel n data: $d_n$

Channel n Walsh sequence: $W_n$

Composite channel -n modulation: $d_n \oplus W_n$ (XOR=binary multiplication)

Figure 3:
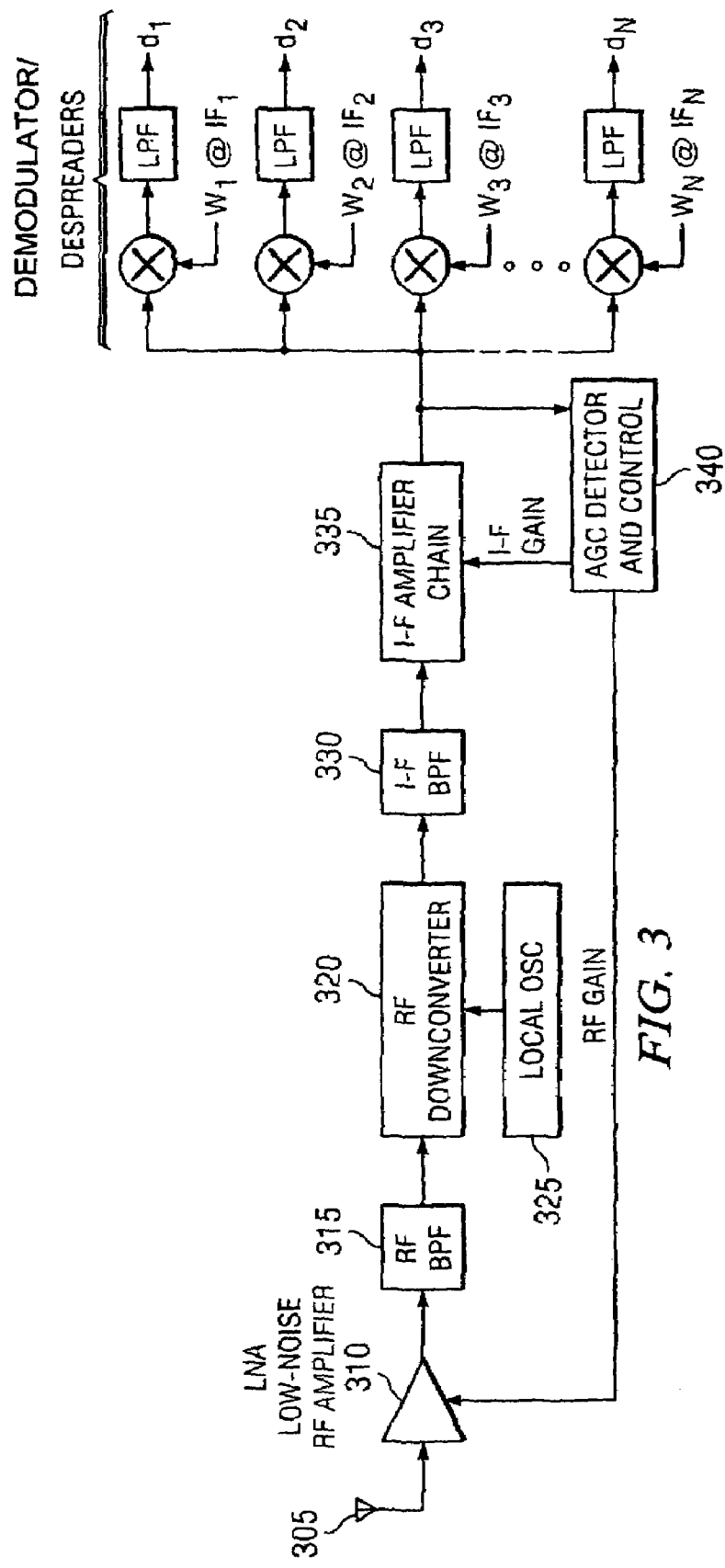

Total OFDM channels: $N=2^m$
Total Walsh set (length) L, where $L=2^l$
Total groups: $N/L=2^m/2^l=2^{m-l}$ FIG. 3 illustrates a block diagram of a MOSS receiver, representing an embodiment of the invention. FIG. 3 depicts a typical MOSS receiver block diagram.

$IF_1, IF_2, \ldots IF_N$ generated by synthesizer or implemented in DSP.

$W_1, W_2, \ldots, W_N$ are Walsh codes 1-N.

"$W_1$ @ $IF_1$" represents Walsh code #1 modulated onto IF channel 1 local carrier.

Figure 4:
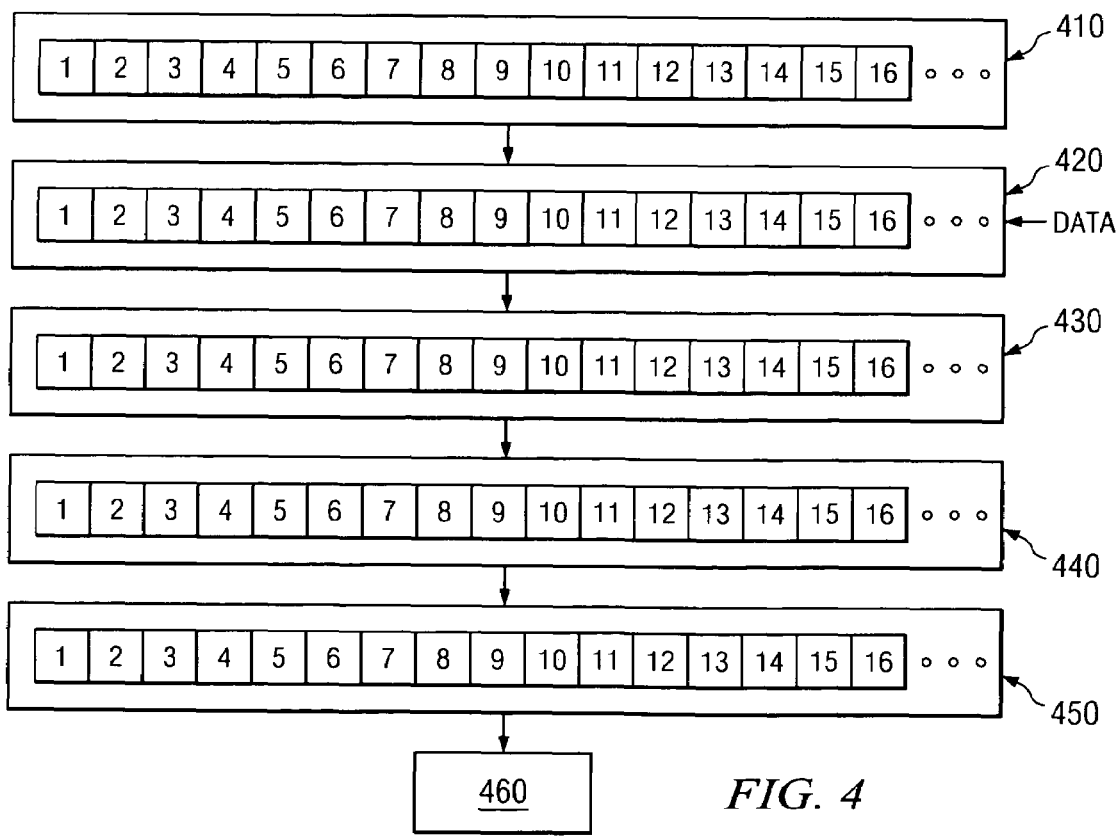

FIG. 4 illustrates a flow diagram of a MOSS multiplexing-modulating process that can be implemented by a computer program, representing an embodiment of the invention.

Figure 5:
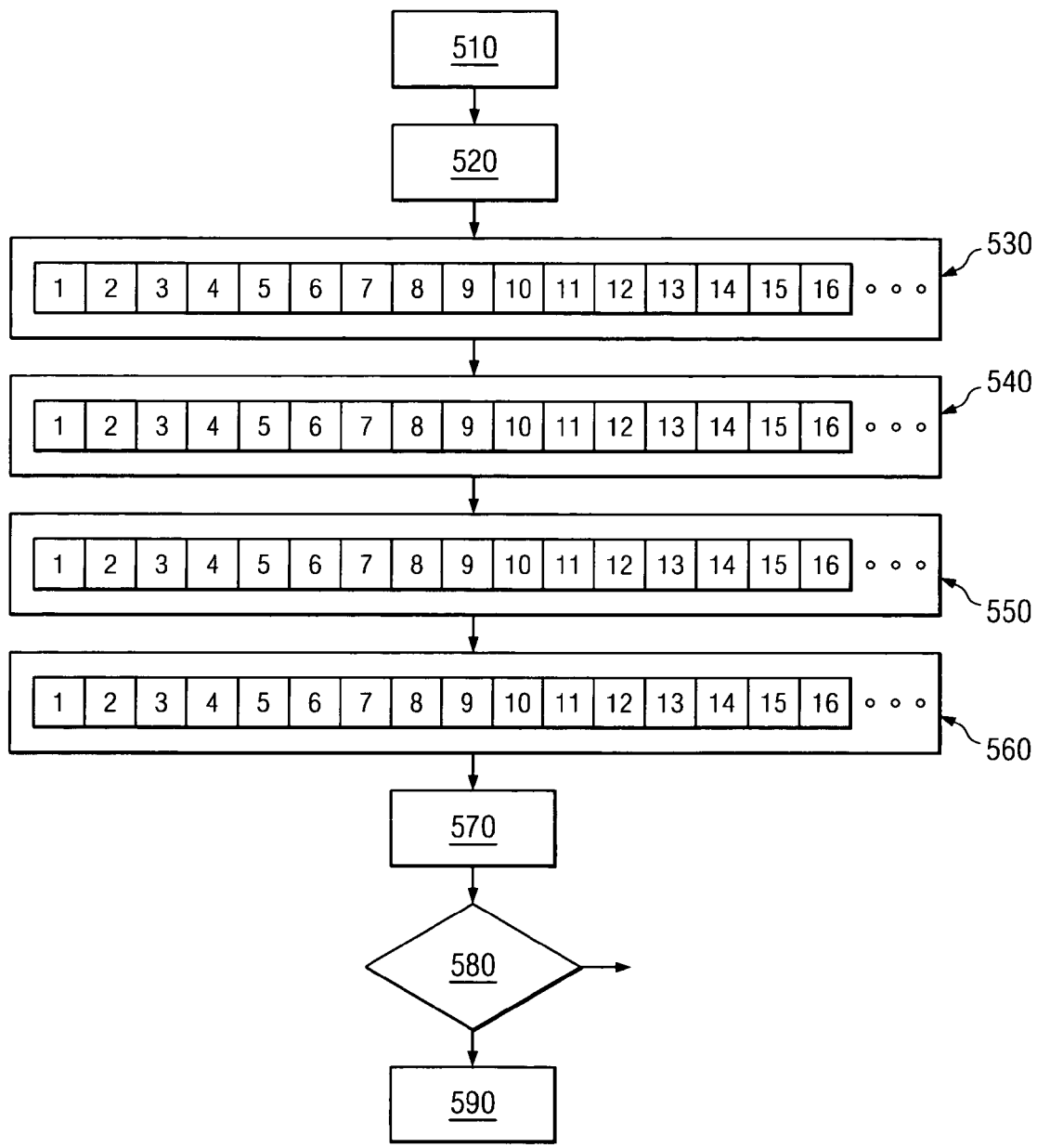

FIG. 5 illustrates a flow diagram of a MOSS demodulating-demultiplexing process that can be implemented by a computer program, representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. patent applications disclose embodiments that are satisfactory for the purposes for which they are intended. The entire contents of U.S. patent application Ser. No. 10/726,446, filed Dec. 3, 2003 are hereby expressly incorporated by reference herein for all purposes. The entire contents of U.S. patent application Ser. No. 09/671,636, filed Sep. 27, 2000, by William B. Dress, Stephen F. Smith and Michael R. Moore, entitled Hybrid Spread-Spectrum Technique for Expanding Channel Capacity, are hereby expressly incorporated by reference herein for all purposes.

Several varieties of hybrid spread-spectrum modulation systems are disclosed in U.S. Ser. No. 09/671,636 and in textbook and journal articles (1-3). However, none of these approaches includes spread-spectrum modulating a plurality of OFDM carriers. Further, none of these approaches realize a constant spread-spectrum process gain to uniformly reject cross-user interference and simultaneously meet the specific requirements of the FCC for full-power ISM band devices.

To be operable at the full 1-watt level permitted by the FCC for true spread-spectrum ISM devices, the signal must provide a minimum 10-dB processing gain. Standard orthogonal frequency-division multiplex (OFDM) systems (i.e., typical U-NII devices) are not intrinsically spread-spectrum and, therefore, cannot achieve the required 10-dB minimum processing gain. To realize a long-distance, high data-rate RF link, where the main-beam SNR is critical to achieving maximum data throughput rates with low errors, the need for an FCC-recognized ISM spread-spectrum modulation method is vital, since only through this specific protocol can very high antenna gains be employed without a concurrent reduction in the radiated RF power (and, therefore link SNR).

The invention can achieve this minimum 10-dB processing gain via the use of multiple OFDM carriers, each orthogonally spaced, which are spread with successive (orthogonal) Walsh, or other suitable, polynomials of approximately length 16 (or greater), optionally in recurring or rotating sequences, to provide a doubly orthogonal relationship between adjacent and neighboring carriers in the set. The assignment of these Walsh codes is typically done in groups (e.g., of 16) to permit reuse of the code set across a much larger carrier set (e.g., 256 frequencies). Although carriers with the same (periodic) Walsh codes do not possess code orthogonality, they are nevertheless inherently orthogonal in frequency and are additionally sufficiently spaced in frequency to facilitate separation via conventional selective filtering. In addition, the individual spread-spectrum carriers may be further modulated (e.g., BPSK, QPSK, OQPSK, MSK, n-QAM, and the like) based on requirements of the specific application.

Thus, the invention can include spread-spectrum modulation/demodulation of a plurality of orthogonal frequency division multiplexed (OFDM) carriers whereby the plurality of spread-spectrum modulated orthogonal frequency division multiplexed carriers are substantially mutually orthogonal. The data stream can be proportionally distributed among the available ODFM carriers, either sequentially, on a bit-interleaved basis, or pseudo-randomly. Data modulation of the multiplexed carriers can be done before, during and/or after the spread-spectrum modulation. The invention can include a highly robust digital data transmission technique incorporating designated groups of spectrally overlapping, mutually orthogonal direct-sequence spread-spectrum (DSSS) carriers spaced at a standard, nonstandard and/or adaptive basis frequency.

To achieve improved robustness against RF interference, impulse noise, and multipath effects, each OFDM carrier can be modulated with a direct-sequence spreading code, either of the pseudorandom maximal linear sequence (MLS) type, a Gold or Kasami code derived from combinations of two or more MLS polynomials (all only approximately orthogonal), or a fully orthogonal Walsh polynomial code set. In this way, the data to be transmitted can be encoded into one, some, or all of the spread-spectrum modulated OFDM carriers.

Optimally, the code sets are selected so that adjacent or neighboring carriers (in frequency) are modulated by mutually orthogonal codes in order to minimize crosstalk among nearby carriers in the group. Although the standard basis function for the multicarrier set can be derived from the Fourier transform, other basis functions such as wavelets may also be employed for improved noise rejection or other specific properties. As a nonlimiting example, using the more popular Fourier set, as might be typically deployed in a Federal Communications Commission (FCC)-designated Industrial, Scientific, and Medical (ISM) operating band, the carriers may be synchronously generated in groups of $2^n$ (e.g., n=16) and spread by a set of standard 16-bit Walsh codes, which themselves are mutually orthogonal. To get a consistent spreading bandwidth, however, the Walsh codes should then be overlaid with an MLS-derived pseudorandom polynomial before, during, and/or after final data modulation.

The total number of carriers in the transmission (and, accordingly, the number of carrier groups) can be selected, based on the available bandwidth within the ISM band, the anticipated coherence bandwidth of the RF channel being utilized, and the amount of DSSS process gain (i.e., spreading factor) desired. This selection can be adaptive with regard to the number of carriers and their spacing. This would result, for this case, in a total of $2^k$ (e.g., 256 for k=8) carriers in the composite signal, or 16 groups of 16 carriers each.

Optionally, each carrier may itself be comprised of two, or more phase-orthogonal components (typically designated in industry-standard parlance as "I" and "Q" subcarriers) which may each have similar data symbol-modulation rates ($f_{sym}$), for a total data rate per carrier of $2 \cdot f_{sym}$. In this case, the total composite data rate for the MOSS signal set will be $256 \cdot 2 \cdot f_{sym}$, or $512 \cdot f_{sym}$. For standard 4-QAM or QPSK carrier modulations, then, with 2 bits/symbol on all subcarriers, the data-bit rate is doubled; for higher density constellations, e.g., 16-QAM, with 4 bits/symbol, the effective data rate is quadrupled over the base case. This latter condition is particularly useful for high signal-to-noise ratio (SNR) links with large data throughput requirements.

For example, to meet the specific constraints of the current FCC's rules for spread-spectrum ISM devices in the 5.725-5.825 GHz band and permit the maximum statutory operating RF power output of 1 watt, along with providing adequate spectral efficiency to permit upwards of 100 Mbit/s data rates, a preferred system configuration of the invention includes a multiplicity (e.g., 16, 64, or 256) of carriers in an orthogonally spaced set (the OFDM grouping) which are in-turn individually modulated by a consecutive set of successively (and mutually) orthogonal Walsh polynomials of a length of at least 16 ($2^n$, where $n \geq 4$). Here, the effective Walsh chipping rate is $2^n$ times the individual-channel symbol rate. Depending on the channel's coherence bandwidth and other factors, the number of OFDM carriers, the length of the Walsh spreading polynomials, and the carrier symbol rates can be adjusted to optimize link performance in terms of error rates, RF transmitting power, and channel count as desired. A minimum Walsh polynomial length of 16 will provide some 12 dB of spread-spectrum processing gain, enough to satisfy the historical 10-dB FCC minimum figure for ISM use. These groups of carriers can be optimally interleaved as in the conventional OFDM format or even overlapped with appropriate coding methods. The carriers can be grouped in sets of 16 and the sets spread with the 16 successive orthogonal codes from the 16-length Walsh set.

Another useful version of the invention involves dynamically switching the DS/OFDM signal between different configurations of carriers and spreading-code lengths, e.g., for $2^m$ carriers and $2^n$ Walsh code lengths, the product $2^m \cdot 2^n$ can be held constant, for approximately constant composite-signal bandwidth, while m and n are adjusted to track changes in propagation (i.e., channel coherence bandwidths in mobile environments), improve data security, or accommodate differing users' data-rate requirements. Additionally, the number of carriers may also be limited somewhat to minimize transmitter and receiver hardware complexity, permit shared-band bidirectional links, etc. Another option is to intermix unspread and spread OFDM carriers for highly asymmetric links or for other special applications. Still another variation of the invention encompasses the use of Gold, Kasami, and other spreading polynomials which are only approximately orthogonal but which have some more desirable properties than Walsh polynomials in certain scenarios.

Figure 1:
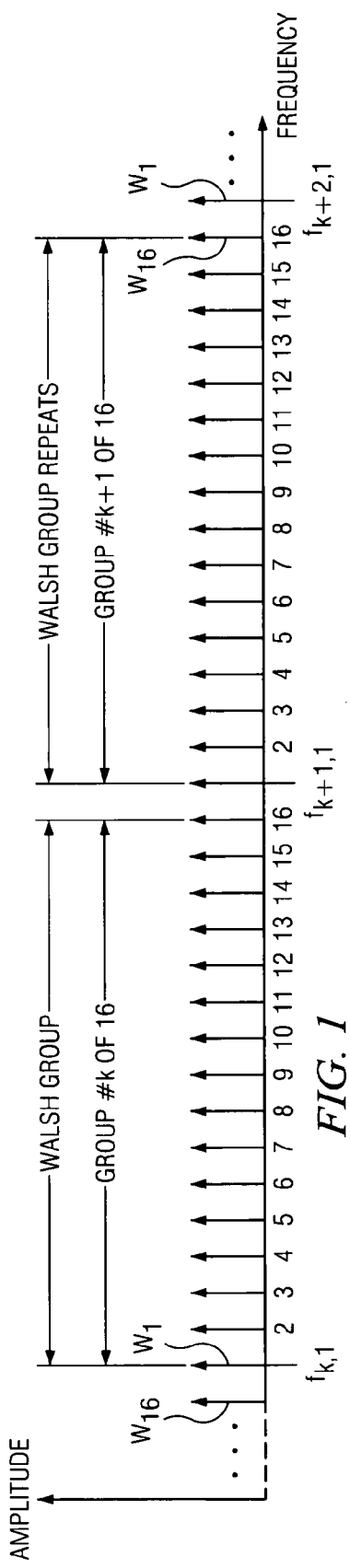
FIG. 1 illustrates a spectral plot of a multicarrier orthogonal spread-spectrum (MOSS) carrier set, representing an embodiment of the invention.

FIG. 1 depicts a spectral plot of a MOSS carrier set. An exemplary grouping of sets of 16-length Walsh codes is shown in FIG. 1. Although the code set depicted in FIG. 1 is sequential, the invention is not limited to sequential codes. The individual codes of the set can be interleaved. Further, the individual codes of the set can be scrambled. Although the use of a repeating Walsh code set is depicted in FIG. 1, the invention is not limited to the use of repeating code sets, or the use of Walsh codes. A single code set can be used, and/or the code set(s) can be based on a pseudorandom maximal linear sequence, a Gold or Kasami code derived from combination of a plurality of maximal linear sequence polynomials, a Walsh polynomial code set, Fourier codes and/or wavelet codes.

FIG. 2 depicts a representative block diagram for a composite MOSS transmitter; the individual OFDM channels $f_1$ though $f_N$ can be generated by a series of N carrier generators (e.g., oscillators), via synthesizer, or through DSP techniques, as appropriate. The individual carriers are modulated by both their respective data streams $d_1$ through $d_N$ and their corresponding channel Walsh codes $W_1$ through $W_N$ by a series of N data modulators. For example, a single data modulator is used to impress the logical product ($\oplus$, or XOR) of the Walsh-sequence chips and the synchronized data bit stream, as depicted at left. Next, all channels (carriers) are linearly summed or combined by a linear summer 210 and amplified by a radio frequency power amplifier 220, though alternatively the amplification of each channel (carrier) may be accomplished prior to final combining of the carriers. Finally, the composite multicarrier signal is sent to the transmitting antenna 230. The specific steps to encode the MOSS carrier set can compose the invention.

FIG. 3 depicts a block diagram for a MOSS receiver. The input multicarrier signal from the receiving antenna 305 is amplified in a low-noise front-end gain stage 310 (LNA), radio-frequency (RF) bandpass filtered by a suitable-bandwidth bandpass filter (BPF) 315 to remove spurious, out-of-band, and image-frequency components, and downconverted by an RF downconverter 320. A local oscillator 325 is coupled to the RF downconverter 320. These stages should be fairly broadband, at least enough to pass the full width of the desired MOSS signal spectrum. Next, the downconverted signal, now at the receiver's intermediate frequency (I-F), is bandpass filtered by an intermediate-frequency bandpass filter 330 to shape the overall IF response, greatly boosted in amplitude by an intermediate frequency (I-F) amplifier chain 335, and presented to the array of N demodulator/despreader blocks. An automatic gain-control detector and control circuit 340 is coupled to both the IF amplifier chain and the RF low-noise amplifier 310. The demodulator/despreader blocks may include multiple IF carrier sources, Walsh data modulators, and post-demodulation low-pass filters to extract the data streams from the individual channels. In many implementations, however, these functions can all be accomplished via DSP (digital signal processor) techniques, where the output signal from the IF chain is first digitized by a fast ADC (analog-to-digital converter). The high-speed data stream from the ADC is then demodulated, despread, and filtered in DSP blocks, directed by software routines or hardware logic, as dictated by processing speed requirements. The specific steps to decode the MOSS carrier set can compose the invention.

FIG. 4 depicts a flow diagram of a MOSS multiplexing-modulating process that can be implemented by one, or a plurality of, computer program(s). In block 410 a plurality of OFDM carriers are provided. Although two sets of 16 carriers are shown in FIG. 4, the three horizontally arranged dots in each block indicate that additional set(s) can be provided and it can be appreciated that the number of carriers is variable, as is their set arrangement. In block 420 data is distributed (e.g., buffered). The data can be sequentially distributed, interleaved and/or scrambled among the available carriers. In block 430 the carriers are individually data modulated (encoded). In block 440 the data modulated carriers are spread. Although the example shown in FIG. 4 involves data modulation (encoding) followed by spread-spectrum modulation, the invention is not limited to this sequence of operations and data modulation (encoding) can follow, or be simultaneous with, the spread-spectrum modulation. In block 450, the spread, data-modulated carriers are amplified. Although the example depicted in FIG. 4 shows the carriers being individually amplified, the invention is not limited to individual amplification and the spread data-modulated (encoded) carriers can be summed before amplification. In block 460 the amplified spread data-modulated carriers are transmitted. Although FIG. 4 shows the connections between the operations as a single downward pointing arrow, it is important to note that the signal transfer can be fully parallel, partially grouped and/or singular.

FIG. 5 depicts a flow diagram of a MOSS demodulating-demultiplexing process that can be implemented by one, or a plurality of, computer program(s). In block 510 the composite signal is received. In block 520 the received signal is amplified. In block 530 the amplified received signal is individually filtered to separate the ODFM carriers. Although two sets of 16 filtered carriers are shown in FIG. 5, the three horizontally arranged dots in each block indicate that additional set(s) can be provided and it can be appreciated that the number of carriers is variable, as is their set arrangement. In block 540 the individually filtered carriers are despread. In block 550 the despread carriers are data demodulated (decoded). In block 560 the data is de-distributed (e.g., buffered). The data can be sequentially de-distributed, de-interleaved and/or de-scrambled among the available carriers. In block 570 error checking is performed. In block 580 a decision is made as to whether the error rate is excessive. If the error rate is excessive, the system can be reconfigured in block 590, otherwise the system can be continued. Although FIG. 5 shows the connections between the operations as a single arrow, it is important to note that the signal transfer can be fully parallel, partially grouped and/or singular.

The invention can include continuous or intermittent error-rate monitoring. The invention can include adaptive reconfiguration of the system parameters such as the number of carriers, the spread-spectrum modulation codes, and the number and spacing of the carriers, as well as the level of optimal phase modulation to optimize the data rate and the error rate.

The invention can also be included in a kit. The kit can include some, or all, of the components that compose the invention. The kit can be an in-the-field retrofit kit to improve existing (orthogonal frequency division multi-plexed) systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

While not being limited to any particular performance indicator or diagnostic identifier, preferred embodiments of the invention can be identified one at a time by testing for the presence of low error rates. Preferred embodiments of the invention can also be identified one at a time by testing for robustness against RF interference. Preferred embodiments of the invention can also be identified one at a time by testing for resistance against crosstalk between the carriers. The test(s) for the presence of low error rates, robustness against RF interference and/or resistance to crosstalk can be carried out without undue experimentation by the use of a simple and conventional error rate experiment.

Many alternative versions of the invention are possible, based on the numerous potential variations in the parameter set, including total bandwidth, number of RF carriers, spreading code families (exactly or partially orthogonal), code lengths, carrier data rates, data-modulation coding employed on the parallel carriers, symbol coding, error correction, and error detection techniques. Additional parameters include power levels, efficiencies, constant-envelope properties, peak-to-average power ratios (PARs), and out-of-band emissions. For example, a fixed point-to-point link between two highly directional antennas in an isolated clear path, could employ rather high symbol rates (short periods), whereas mobile links subject to multipath and Doppler effects would generally opt for longer symbol periods to combat the higher delay spreads encountered in the mobile environment. In addition, the rapid switching of the parameters of the composite signal, which may be adaptive in nature to correct for changing paths and RF propagation conditions, can also be used in a controlled manner to render the signal very difficult to intercept or detect (LPI/LPD).

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

Practical Applications of the Invention

Practical applications of the invention that have value within the technological arts include fixed and mobile high-speed data links, satellite links, military and national security communications; industrial and commercial uses (both domestic and foreign), or the like. There are virtually innumerable uses for the invention, all of which need not be detailed here.

Advantages of the Invention

A communicating scheme, representing an embodiment of the invention, can be cost effective and advantageous for at least the following reasons. Fundamental advantages of the invention over prior-art techniques are not necessarily in overall data rates achievable by use of multicarrier techniques, but are provided by in the application of the mutually orthogonal, overlapping spread-spectrum modulation of the multiple carriers therein to: (1) gain additional robustness for the multicarrier OFDM signal against narrowband interference, wideband impulsive noise such as lightning and similar transient signals, and deliberate jamming sources; (2) provide drastically improved data security through the more complex modulation format; (3) provide significantly more flexibility in signal format selection by permitting fixed and/or dynamic, adaptive programming of the key signal parameters such as number of carriers, (sub)carrier-frequency spacing, and spreading-code types and lengths; and (4) incorporate direct-sequence spreading to the composite multicarrier signal set in a format compliant with FCC-imposed regulations for unlicensed direct-sequence spread-spectrum devices operating in the authorized ISM bands. Such a signal set is particularly desirable in the case of the 2.450-2.4835 and 5.725-5.825 GHz ISM bands and the 5.1-5.7 GHz U-NII bands; in the top band, signals employing direct-sequence spreading with processing gains of at least 10 dB may be employed at a transmitted RF power level of 1 watt, whereas non-spread signals are limited to just 250 mW. In addition, according to current FCC rules, unlimited antenna gains may be employed in this band in fixed point-to-point applications without any reduction in the maximum 1-W transmitter power level; these two regulations thus permit the use of the inventive spread-spectrum signals for long-range, unlicensed dish-to-dish RF data links for applications such as high-speed networking building-to-building interconnects and in many mobile-data applications. The invention improves quality and/or reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all possible configurations. Further, variation may be made in the steps or in the sequence of steps composing methods described herein. Further, although the apparatus for individually spread/data modulating/demodulating the OFDM carriers described herein can be a separate module, it will be manifest that the apparatus for individually spread/data modulating/demodulating the OFDM carriers may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1 *Multi-Carrier Spread-Spectrum*, edited by Kahled Fazel and Gerhard P. Fettweis, Kluwer Academic Publishers, Dordrecht, The Netherlands, 1997, ISBN 0-7923-9973-0, "Performance Analysis of a New Multi-Code and Multi-Carrier Hybrid transmission scheme for Future Broadband Mobile Communications Systems", Hiroshi Harada and Ramjee Prasad, pages 41-48.

2 *Multi-Carrier Spread-Spectrum*, edited by Kahled Fazel and Gerhard P. Fettweis, Kluwer Academic Publishers, Dordrecht, The Netherlands, 1997, ISBN 0-7923-9973-0, Multi-Carrier Modulated Orthogonal Code-Division Multiple Access (MCM-OCDMA), D. Thomas Magill, pages 105-110.

3 *Performance Analysis of Coded Multicarrier Spread-Spectrum Systems in the Presence of Multipath Fading and Nonlinearities*, Je-hong Jong and Wayne E. Stark, *IEEE Transactions on Communications*, Vol. 49, No. 1, January 2001.

What is claimed is:

1. A method, comprising individually spread-spectrum modulating at least two of a set of orthogonal frequency division multiplexed carriers, wherein the resulting individually spread-spectrum modulated at least two of a set of orthogonal frequency division multiplexed carriers are substantially mutually orthogonal with respect to both frequency division multiplexing and spread-spectrum modulation, and realizing a constant spread-spectrum process gain to uniformly reject cross-user interference by using groups (#k, #k+1) of spectrally overlapping multiple OFDM carriers, each orthogonally spaced, which are spread with successive orthogonal polynomials in recurring or rotating sequences to provide a doubly orthogonal relationship between adjacent and neighboring carriers in the set.

2. The method of claim 1, further comprising individually spread-spectrum modulating at least two of another set of orthogonal frequency division multiplexed carriers, wherein the resulting individually spread-spectrum modulated at least two of the another set of orthogonal frequency division multiplexed carriers are substantially mutually orthogonal with respect to both frequency division multiplexing and spread-spectrum modulation.

3. The method of claim 1, wherein spread-spectrum modulating includes direct-sequence spreading using a pseudorandom maximal linear sequence.

4. The method of claim 1, wherein spread-spectrum modulating includes direct-sequence spreading using at least one code selected from the group consisting of a Gold code derived from combinations of a plurality of maximal linear sequence polynomials and a Kasami code derived from combinations of a plurality of maximal linear sequence polynomials.

5. The method of claim 1, wherein spread-spectrum modulating includes direct-sequence spreading using a fully orthogonal Walsh polynomial code set.

6. The method of claim 1, wherein frequency division adjacent individually spread-spectrum modulated orthogonal frequency division multiplexed carriers are spread-spectrum modulated by at least one member selected from the group consisting of mutually orthogonal Fourier codes and mutually orthogonal wavelet codes.

7. The method of claim 1, further comprising modulating at least one of the individually spread-spectrum modulated orthogonal frequency division multiplexed carriers using at least one modulation technique selected from the group consisting of BPSK, QPSK, OQPSK, MSK, and n-QAM.

8. The method of claim 1, further comprising spread-spectrum demodulating at least two of the set of individually spread-spectrum modulated orthogonal frequency division multiplexed carriers.

9. The method of claim 8, further comprising orthogonal frequency division demultiplexing the demodulated individually spread-spectrum modulated orthogonal frequency division multiplexed carriers.

10. A computer program, comprising computer or machine readable program elements translatable for implementing the method of claim 1.

11. An electronic media, comprising a program for performing the method of claim 1.

12. A method comprising; individually spread-spectrum demodulating at least two of a set of individually spread-spectrum modulated orthogonal frequency division multiplexed carriers that are substantially mutually orthogonal with respect to both frequency division multiplexing and spread-spectrum modulation, and
realizing a constant spread-spectrum process pain to uniformly reject cross-user interference by using groups (#k, #k+1) of spectrally overlapping multiple OFDM carriers, each orthogonally spaced, which are spread with successive orthogonal polynomials in recurring or rotating sequences to provide a doubly orthogonal relationship between adjacent and neighboring carriers in the set.

13. The method of claim 12, further comprising individually spread-spectrum demodulating at least two of another set of individually spread-spectrum modulated orthogonal frequency division multiplexed carriers that are substantially mutually orthogonal with respect to both frequency division multiplexing and spread-spectrum modulation.

14. The method of claim 12, wherein spread-spectrum demodulating includes direct-sequence despreading using a pseudorandom maximal linear sequence.

15. The method of claim 12, wherein spread-spectrum demodulating includes direct-sequence despreading using at least one code selected from the group consisting of a Gold code derived from combinations of a plurality of maximal linear sequence polynomials and a Kasami code derived from combinations of a plurality of maximal linear sequence polynomials.

16. The method of claim 12, wherein spread-spectrum demodulating includes direct-sequence despreading using a fully orthogonal Walsh polynomial code set.

17. The method of claim 12, wherein frequency division adjacent individually spread-spectrum modulated orthogonal frequency division multiplexed carriers are spread-spectrum demodulated by at least one member selected from the group consisting of mutually orthogonal Fourier codes and mutually orthogonal wavelet codes.

18. The method of claim 12, further comprising demodulating at least one of the individually spread-spectrum modulated orthogonal frequency division multiplexed carriers using at least one modulation technique selected from the group consisting of BPSK, QPSK, OQPSK, MSK, and n-QAM.

19. The method of claim 12, further comprising orthogonal frequency division demultiplexing the demodulated individually spread-spectrum modulated orthogonal frequency division multiplexed carriers.

20. A computer program, comprising computer or machine readable program elements translatable for implementing the method of claim 12.

21. An electronic media, comprising a program for performing the method of claim 12.

22. An apparatus, comprising: a plurality of orthogonal frequency division multiplex generators; a plurality of data modulators, each of the plurality of data modulators coupled to one of the plurality of orthogonal frequency division multiplex generators; and a linear summer coupled to the plurality of data modulators,
wherein a constant spread-spectrum process gain uniformly rejects cross-user interference by using groups (#k, #k+1) of spectrally overlapping multiple OFDM carriers, each orthogonally spaced, which are spread with successive orthogonal polynomials in recurring or rotating sequences to provide a doubly orthogonal relationship between adjacent and neighboring carriers in a set of individually spread-spectrum modulated orthogonal frequency division multiplexed carriers.

23. The apparatus of claim 22, further comprising a radio-frequency power amplifier coupled to the linear summer and an antenna coupled to the radio-frequency power amplifier.

24. An integrated circuit, comprising the apparatus of claim 22.

25. A circuit board, comprising the integrated circuit of claim 24.

26. A transmitter, comprising the circuit board of claim 25.

27. An apparatus, comprising a plurality of demodulator/despreader circuits; and a plurality of low-pass filters, each of the plurality of low-pass filters coupled to one of the plurality of demodulator/despreader circuits,
wherein a constant spread-spectrum process gain uniformly rejects cross-user interference by using groups (#k, #k+1) of spectrally overlapping multiple OFDM carriers, each orthogonally spaced, which are spread with successive orthogonal polynomials in recurring or rotating sequences to provide a doubly orthogonal relationship between adjacent and neighboring carriers in a set of individually spread-spectrum modulated orthogonal frequency division multiplexed carriers.

28. The apparatus of claim 27, wherein each of the demodulator/despreader circuits and the associated low-pass filters composes a digital signal processor.

29. The apparatus of claim 28, further comprising an analog-to-digital converter coupled to the digital signal processor.

30. The apparatus of claim 27, further comprising an intermediate-frequency amplifier chain coupled to the plurality of demodulator/despreader circuits; an intermediate-frequency bandpass filter coupled to the intermediate-frequency amplifier chain; a radio-frequency downconverter coupled to the intermediate-frequency bandpass filter; a low-noise radio-frequency amplifier coupled to the radio-frequency downconverter; and an antenna coupled to the low-noise radio-frequency amplifier.

31. An integrated circuit, comprising the apparatus of claim 27.

32. A circuit board, comprising the integrated circuit of claim 31.

33. A receiver, comprising the circuit board of claim 32.

* * * * *

UNITED STATES PATENT AND TRADEMARK OFFICE
CERTIFICATE OF CORRECTION

| | |
|---|---|
| PATENT NO. | : 7,315,563 B2 |
| APPLICATION NO. | : 10/726475 |
| DATED | : January 1, 2008 |
| INVENTOR(S) | : Stephen F. Smith and William B. Dress |

Page 1 of 1

It is certified that error appears in the above-identified patent and that said Letters Patent is hereby corrected as shown below:

Column 11, line 47 in claim 12, please change "pain" to -- gain --.

Signed and Sealed this

Second Day of September, 2008

JON W. DUDAS
*Director of the United States Patent and Trademark Office*